United States Patent [19]
Stoneham et al.

[11] Patent Number: 5,311,228
[45] Date of Patent: May 10, 1994

[54] CAMERA WITH OPTICAL FILM METERING AND IMAGE FRAME DATA ENCODEMENT

[75] Inventors: Jeffrey R. Stoneham, Spencerport; John H. Minnick, Rochester, both of N.Y.

[73] Assignee: Eastman Kodak Company, Rochester, N.Y.

[21] Appl. No.: 15,713

[22] Filed: Feb. 9, 1993

[51] Int. Cl.$^5$ .............................. G03B 17/24
[52] U.S. Cl. ................................... 354/106
[58] Field of Search ............. 354/105, 106, 173.1, 354/173.11, 212, 215

[56] References Cited

U.S. PATENT DOCUMENTS

| | | | |
|---|---|---|---|
| Re. 32,797 | 12/1988 | Harvey | 354/481 |
| 4,583,831 | 4/1986 | Harvey | 354/106 |
| 4,652,104 | 3/1987 | Harvey | 354/106 |

FOREIGN PATENT DOCUMENTS 0503510  6/1992  European Pat. Off. ..... G03B 17/24

Primary Examiner—David M. Gray
Attorney, Agent, or Firm—Francis H. Boos, Jr.

[57] ABSTRACT

Film encodement method and apparatus for optically encoding image frame format information on the film in a camera adapted to receive film having film metering perforations along one side of the film which are spaced apart by the length of film frame areas on the film. Data representing a desired frame format for the resultant photoprint is optically encoded on the film between the spaced apart perforations by the same perforation sensor LED, operative in the visible light spectral region, as is used to perform film metering in the camera.

9 Claims, 2 Drawing Sheets

CAMERA WITH OPTICAL FILM METERING AND IMAGE FRAME DATA ENCODEMENT

FIELD OF INVENTION

This invention relates to the field of photographic film cameras and more particularly to cameras adapted for optical recording on the film strip of indicia designating image frame format information.

BACKGROUND

It is known to record indicia on film within a camera at the time a picture is taken to designate a desired image frame format for the resultant photo print that differs from a standard frame format. The use of pseudo format reproduction is an example of such a print format variation wherein the resultant print may be in a pseudo telephoto or a pseudo panoramic format.

A pseudo telephoto print ("pseudo tele") is one that is made from a restricted central portion of a film image frame that usually has the same width-to-length aspect ratio, e.g. 1.0:1.5 (or 4"×6"), as that of the original full sized frame on the film (for 35mm film). During the printing process, the peripheral portions of the film image frame are masked off and the central portion is enlarged to the desired size to give a print with an apparent telephoto or close-up format. The degree of telephoto effect is determined by the enlargement and masking employed at the printer.

A pseudo panoramic print ("pseudo pan") is one in which upper and lower portions of the film image frame are masked off to provide a resultant viewing area in the print that has an elongated width-to-length aspect ratio greater than 1:2 and preferably 1:3. During the printing process, the film image frame is masked as described and the image is enlarged to provide a full height print with the appearance of a panoramic or elongated format. Both pseudo tele and pseudo pan prints are thus accomplished by adjustment of the printer without the need for the use of a true telephoto or wide angle lens in the camera.

It is also well known to provide encodements on film to present an indication to the photofinisher that any given image frame on a film strip is to be printed with a particular pseudo format. Representative examples of such teachings are found in commonly assigned U.S. Pat. Nos. 4,583,831, 4,652,104 and Re. 32,797. In such disclosures, one or more dedicated light emitting diodes (LED's) are provided to expose film margins or interframe regions with encodement that, after processing of the film, are readable at the printer to produce the appropriate pseudo-format prints.

Recently, proposals have been made to produce still photographic film in which the conventional uniformly spaced perforations ("perfs") along both edges of the film are eliminated and replaced with spaced apart perfs along one edge of the film, the spacing between perfs being left blank. Using suitable film metering arrangements in the camera, the film can be advanced and controlled such that each image frame area is in a well defined location on the film strip relative to the perforations. Both mechanical and optical perf sensing devices have been proposed for the metering function. For optical perf sensing and resultant film metering, it is conventional practice to use an LED that emits in the infrared (non-visible) spectral region so as to avoid unwanted fogging of the film.

In a simple, low cost camera, it is desirable to minimize the parts content in the camera. The provision of separate components for film marking and film metering militates against such an objective. It is therefore desirable to provide apparatus which is capable of performing both functions without unnecessarily adding to the parts content of the camera, thereby to reduce the cost, complexity and size of the camera.

SUMMARY OF THE INVENTION

Thus in accordance with the present invention, there is provided film encodement apparatus for a photographic camera adapted to receive film having perforations along a side thereof which are spaced apart by an amount sufficient to define successive image frame areas along the length of the film. The encodement apparatus comprises perforation sensing means operative during first intervals for sensing said perforations as said film is advanced through the camera, said sensor including a light emitter operative in the visible light spectrum. The apparatus further comprises data encodement generating means for activating said light emitter during second intervals different from the first intervals to expose the film with predetermined film encodement data in a path aligned with the perforations.

DETAILED DESCRIPTION

Figure 1:
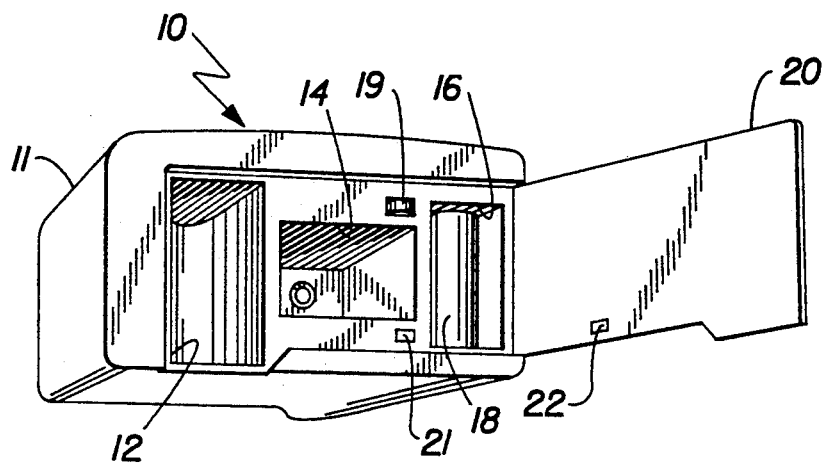
FIG. 1 is a perspective illustration of a camera embodying the present invention.
Figure 3:
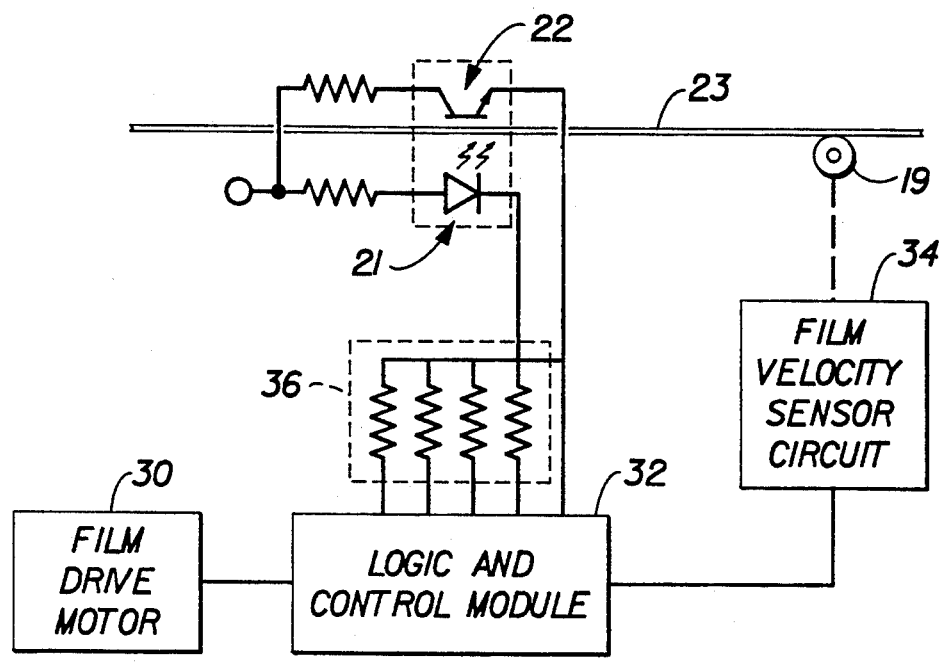
FIG. 3 is a functional block diagram of control circuit useful in the camera of FIG. 1.

Referring to FIG. 1, a camera 10 in which the present invention is embodied is comprised of a camera body 11 and a hinged back cover 20. Camera body 11 is conventionally provided with a film cartridge chamber 12, a film frame aperture 14, film take-up chamber 16 and film take-up spool 18. A rotatable wheel 19 is provided to engage the film and serve as an input device to a film velocity metering sensor circuit 34 (FIG. 3). Camera 10 is provided with perforation sensing means including a light emitting LED 21 mounted the camera body adjacent film frame aperture 14 and a light sensor 22 mounted and so positioned on camera back 20 that when back 20 is closed sensor 22 is aligned with LED 21. A film drive motor 30 (FIG. 3) is mounted within camera body 11 and drives takeup spool 18 to advance film strip 23 through the camera thereby to position successive image frame areas over the exposure aperture 14.

Figure 2:
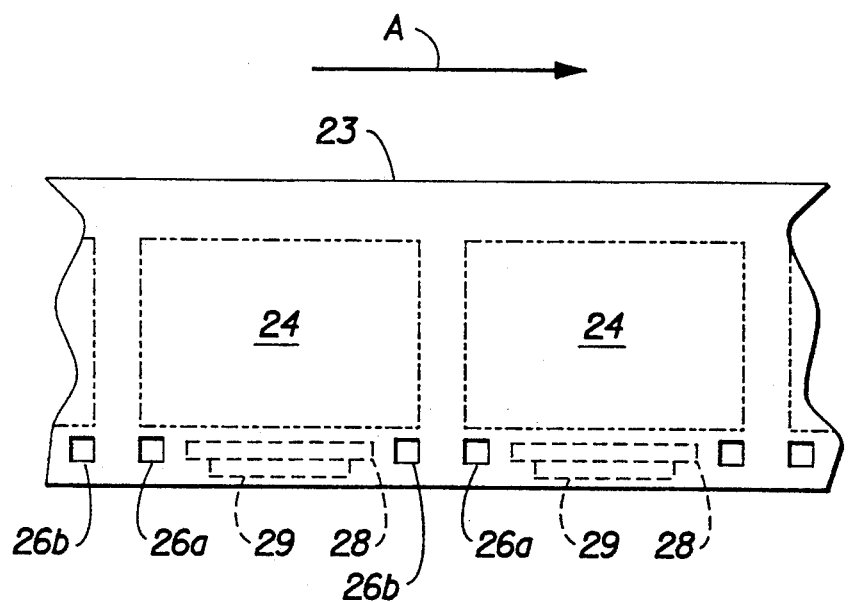
FIG. 2 is diagrammatic illustration of a film strip used in explaining the present invention.

Referring jointly to FIGS. 2 and 3, camera 10 is adapted to receive a film strip 23 having repeating, spaced-apart pairs of perforations 26a, 26b along one side of the film strip. The spacing between successive perforation pairs is such as to define successive image frame areas 24 along the length of the film. As is known, the perforations 26a, 26b serve a film metering function primarily for positioning of successive image frame areas on the frame exposure aperture 14 in the camera and subsequently to position exposed image frames in the film gate of photofinishing equipment. For film position metering within camera 10, there is provided perforation sensing means including a light emitter, LED 21, and a solid state light sensor 22 coupled to a logic and control module 32 and operative during first predetermined intervals for sensing the presence of the perforations as the film is advanced through the camera by means of film drive motor 30 operating under the control of module 32. The perforation sensing means combines with logic and control circuit 32 to control the operation of film drive motor 30 in such a manner as to stop film motion when the perforations 21 are sensed so as to position successive image frame areas 24 over the exposure aperture 14. In conventional optical film metering arrangements of this type, LED 21 is normally operative to emit light in the infrared spectral region which does not affect the emulsion on the film 23 thus avoiding undesired fogging of the film. In accordance with the present invention however, LED 21 is preferably chosen to emit light in the visible light region to allow the LED to be used to expose the film with a latent image data encodement in a path between the perforation pairs.

The film encodement apparatus of the invention further includes data encodement generating control means comprised of a suitably programmed microprocessor within logic and control module 32 operative during second predetermined intervals, distinct from the first intervals during which perforation sensing is performed, to expose the film with predetermined latent image film encodement data in a path aligned with the perforations in the film. It will be appreciated that the term "interval" is used herein interchangeably in reference to time intervals during which film is being translated by film drive motor 30 through the camera and to the corresponding longitudinal intervals or lengthwise dimensions on the film. In FIG. 2, the dotted outlines 28 designate the intervals in which the data encodement is recorded on the film, the spaces between outlines 28 being the intervals during which perf sensing is performed. Dotted outlines 29 designate areas reserved for the recording of pre-flashed latent image DX bar coded information by the manufacturer at the time of film production. As can be seen, this latent image DX bar code region lies in the film margin between the edge of the film the perforations 26a, 26b thus leaving the area in the longitudinal path between the perforations free to record the latent image data encodement information. Because LED 21 operates in the visible light spectrum, it is preferred that the opening in the camera body through which the LED exposes the film be small enough to form a mask that constrains the emitted light to the narrow path encompassing the perforations and the area in which the data encodement latent image is to be formed with minimal lateral light emission that might affect the image frame area 24 or the DX latent image bar code in area 25.

Figure 4:
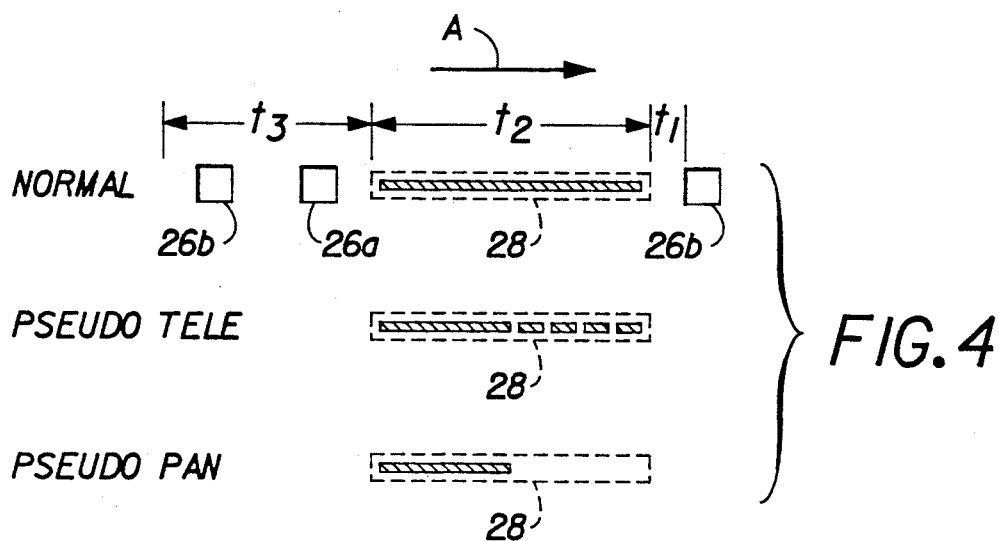
FIG. 4 is a diagram of one version of film encodement applied to film by the circuit of FIG. 3.

FIG. 4 graphically illustrates representative data encodements which, by convention, might designate three different film frame formats. In the upper portion of the figure labeled "NORMAL", the camera is assumed to be operating in the normal mode in which the full image frame with standard aspect ratio would be reproduced in the resultant photoprint. When the film drive motor is initiated to advance the film to the next successive film frame position, the film metering LED 21 is held in the OFF condition by the logic and control module 32 for an initial interval $t_1$ and then turned ON for an interval $t_2$ thus exposing the film to create an elongated stripe which, by convention, designates that the frame should be reproduced in a normal frame aspect ratio. At the conclusion of interval $t_2$, the LED 21 could be momentarily turned OFF then ON or, in the alternative, just allowed to remain ON to perform the perf sensing function during interval $t_3$. Once the perf sensing function is complete, the LED 21 is turned OFF until the next film advance cycle is initiated. In the middle sequence, labeled "PSEUDO TELE" in the figure, following the initial interval $t_1$, the LED is modulated ON and OFF by control module 32 for the first half of interval $t_2$ to create a pattern that, by convention, indicates the frame is to be reproduced as pseudo tele format. For the bottom sequence, labeled "PSEUDO PAN", the LED 21 is held OFF through the first half of interval $t_2$ and then turned ON thereby designating the frame to be reproduced in pseudo pan format. Control of the LED at the conclusion of interval $t_2$ for pseudo tele and pseudo encodements would be the same as in the case of the "normal" encodement. The result is a unique series of exposed latent image stripes or blips on the film created by the same apparatus as is used for film metering (perf sensing) that will then be machine readable after processing at the photofinisher to indicate the frame format to be employed in producing the desired photographic print.

For known film advance velocities, the time interval $t_2$ when LED 21 is operated under the control of module 32 to perform film encodement can be determined by means of a suitable clock controlled timing circuit in module 32. Alternatively, in order to accommodate variations in film advance velocity, metering wheel 19 and film velocity sensor circuit 34 may be provided to adjust the timing of the activation of LED 21 to confine the encoding function to a defined length space between successive perforation pairs as well as to control the timing of the blips in the case of the illustrated code representing the pseudo-tele mode.

In order to accommodate films of different speed (sensitivity) ratings, the exposure level of LED 21 can be controlled through a variable resistive network selectively determined by logic and control module 32 operating in response to a conventional DX camera subsystem in which film speed information is either inserted by the camera user or is read from DX bar code information imprinted on the film cartridge or magnetically recorded in a magnetic layer on the film.

It will be appreciated from the foregoing that what has been described is a simple apparatus and method for optically recording film encodement data in a camera of the type normally comprising a film metering arrangement without the need for additional encodement apparatus which would otherwise add cost and complexity to the camera.

The invention has been described in detail with particular reference to a presently preferred embodiment, but it will be understood that variations and modifications can be effected within the scope of the invention as set forth in the claims appended hereto.

What is claimed is:

1. Film encodement apparatus for a photographic camera adapted to receive film having perforations along a side thereof which are spaced apart by an amount sufficient to define successive image frame areas along the length of the film, said apparatus comprising:
  sensing means including a light emitter operative in the visible light spectrum for sensing said film perforations to meter positioning of said film in the camera; and control means operative during first intervals to activate said light emitter for sensing of said perforations and operative during second intervals distinct from said first intervals for controlling activation of said light emitter to expose said film with predetermined film encodement data in a path aligned with said perforations.

2. Film encodement apparatus of claim 1 wherein said light emitter is comprised of a light emitting diode emitting in the visible light spectrum.

3. Film encodement apparatus of claim 1 wherein said control means is operative such that initiation of said second interval is separated from completion of a preceding first interval by an intervening interval during which said light emitter is deactivated.

4. Film encodement apparatus of claim 1 further including film velocity sensing means responsive to film motion in the camera for generating an indication of the velocity of said film motion and said control means is responsive to said velocity indication for timing of said first and second intervals.

5. Film encodement apparatus of claim 1 wherein said film encodement data designates image frame format of a print to be reproduced from said film image frame.

6. A method of optically exposing encodement data onto film in a camera of the type having optical perforation sensing means including a light emitter operative to emit light in the visible light spectrum, the method comprising:

exposing said encodement data on the film with said perforation sensing light emitter during an interval of film advancement not used for perforation sensing.

7. A method of operating a photographic camera of the type adapted to receive film having perforations along a side thereof which are spaced apart by an amount sufficient to define successive image frame areas along the length of the film, the method comprising:

advancing said film in the camera between successive image frame areas sensing said perforations during said film advancement with a light emitter emitting light in the visible spectrum; and exposing said encodement data on the film with said perforation sensing light emitter during an interval of film advancement not used for perforation sensing.

8. The method of claim 6 further comprising the steps of initiating advance of said film in the camera to a next successive image frame area, holding said light emitter inactive during a predetermined interval following initiation of film advance, then controlling activation of said light emitter for exposing said encodement data for a predetermined data encodement interval and thereafter holding said light emitter in an ON condition for a subsequent interval to perform perforation sensing.

9. The method of claim 6 further comprising the steps of sensing film velocity during film advance and controlling timing of said interval for data encodement in response to said sensed film velocity.

* * * * *